(12) United States Patent
Pang

(10) Patent No.: US 7,275,082 B2
(45) Date of Patent: Sep. 25, 2007

(54) SYSTEM FOR POLICING JUNK E-MAIL MESSAGES

(76) Inventor: Stephen Y. F. Pang, 515 Barron St., Menlo Park, CA (US) 94025

( * ) Notice: Subject to any disclaimer, the term of this patent is extended or adjusted under 35 U.S.C. 154(b) by 531 days.

(21) Appl. No.: 10/656,502

(22) Filed: Sep. 4, 2003

(65) Prior Publication Data

US 2006/0031303 A1 Feb. 9, 2006

Related U.S. Application Data

(63) Continuation of application No. 09/353,537, filed on Jul. 14, 1999.

(60) Provisional application No. 60/093,120, filed on Jul. 15, 1998.

(51) Int. Cl.
*G06F 15/16* (2006.01)
(52) U.S. Cl. ...................................... 709/206
(58) Field of Classification Search ......... 709/206–207
See application file for complete search history.

(56) References Cited

U.S. PATENT DOCUMENTS 5,999,932 A * 12/1999 Paul ........................... 707/10
6,023,723 A * 2/2000 McCormick et al. ....... 709/206
6,199,102 B1 * 3/2001 Cobb .......................... 709/206
6,249,805 B1 * 6/2001 Fleming, III ................ 709/206
2002/0016824 A1 * 2/2002 Leeds .......................... 709/207

OTHER PUBLICATIONS

Courtney Macavinta, "FTC searches for spam solution", Jun. 12, 1997, CNET News.com, pp. 1-2, http://news.com.com/2100-1023-200486.html.*

* cited by examiner

*Primary Examiner*—Jason Cardone
*Assistant Examiner*—Minh-Chau Nguyen
(74) *Attorney, Agent, or Firm*—Townsend and Townsend and Crew LLP

(57) ABSTRACT

A system for policing an unsolicited e-mail communication. The system has a plurality of clients, each coupled together using a wide area network of computers, such as the Internet or an internet. Each of the clients is adapted to send an indication of an unsolicited e-mail message through an e-mail device for a display. The system also has a policing server coupled to each of the plurality of clients through the wide area network of computers. The policing server is adapted to receive the indication from at least one of the clients. The e-mail device comprises an SPAM icon on the display. The SPAM icon is adapted to send the indication from the client to the policing server.

33 Claims, 11 Drawing Sheets

SYSTEM FOR POLICING JUNK E-MAIL MESSAGES

CROSS-REFERENCES TO RELATED APPLICATIONS

This application claims priority to U.S. patent application Ser. No. 09/353,537 filed Jul. 14, 1999 which claims priority to U.S. Provisional Application No. 60/093,120 filed Jul. 15, 1998, hereby incorporated for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to telecommunication techniques. More particularly, the present invention provides a novel technique, including computer codes, to reduce unwanted e-mail messages from a personal computer, workstation, or the like. These unwanted e-mail messages that were unsolicited are commonly referred to as "SPAM." SPAM includes junk mail or junk e-mail messages including get-rich-quick schemes, advertisements, adult web site information, donation requests, political campaign information, and the like.

A variety of techniques have been used to transmit written messages from one geographic location to another. In the early days, people or messengers were the sole means used to carry written information from one person to another person. Although effective and still used today, messengers were limited by their physical abilities. That is, some messengers could not travel over rough terrain such as rocks, jungles, and other landscapes. Large bodies of water were also difficult to cross. Additionally, messengers generally could not travel over long distances in a short period of time. A human messenger could only travel a few miles or tens of miles during a typical day.

Accordingly, messengers were replaced, at least in part, by carrier pigeons. More particularly, carrier pigeons were used to move small pieces of papers having written information thereon from one geographic location to another. Carrier pigeons were quite efficient in some applications but could not generally travel over substantial distances. Accordingly, a relay of ponies and human riders was used for long distance travel across the North American continent. This relay of ponies was called the "Pony Express." The Pony Express carried written communication in the form of mail on leather pouches carried on the relay of ponies across the United States. Although all of these techniques were somewhat effective, they were often costly, unreliable, and difficult to achieve.

In the modern day world, a combination of transportation techniques are used in the postal system. These techniques include, among others, human carriers (e.g., mailmen), motorized vehicles such as cars or trucks, and airplanes, jets, and the like to physically transport mail throughout the United States. Conventional postal systems are often reliable and cost efficient. They are so efficient that they are often subject to many undesirable influences. One of these influences is the routine transmission of unsolicited advertisements, information, and the like to many households across the United States. On any typical day, an average household receives at least one, if not more than one, unsolicited advertisement. As merely an example, the advertisement can be for carpet cleaning, credit cards, and other goods or services that are routinely sent by companies in an attempt to secure a purchase from the household. In many cases, these unsolicited advertisements often burden the postal system, although the advertisers at least pay for the service. Additionally, households are burdened by the advertisements, which are thrown away. These unsolicited advertisements are also termed as "Junk Mail."

Unfortunately, junk mail is not limited to use in only the conventional postal systems. In many wide area computer networking applications, junk mail is commonly sent to users in large groups, often thousands or perhaps millions of users. For instance, a user of a well known wide area network of computers, which is known as the "Internet," often receives numerous lines of junk mail, which has been coined as SPAM! In fact, SPAM refers to such unsolicited advertisements that come to the user by way of electronic mail, also known as "e-mail." The senders of SPAM are often termed "spammers". Unlike regular mail advertisers, spammers do not pay for the privilege to send SPAM to recipients e-mail boxes.

SPAM has become a significant problem because the volume of SPAM is large. As a courtesy, and under the threat of possible legislation restricting SPAM, many distributors of SPAM now send SPAM with instructions to the recipients of the SPAM on how to be removed from the SPAM distribution list. In most cases, however, e-mail messages often do not include such instructions on how to remove a recipient from a junk e-mail distribution list.

In the cases where instructions are provided, many drawbacks exist. As merely an example, some of the ways to be removed from the mailing lists is time consuming to the recipient. Additionally, there are simply no standards on how recipients may be removed from such mailing lists. Furthermore, the techniques that are available to the recipient often require the recipient to perform time consuming tasks, such as sending a reply e-mail to the junk e-mail message and specifically typing a request to be removed from the mailing list, forwarding the e-mail message to another e-mail address and typing a request with specified text requesting removal, connecting to a particular web site and following instructions for removal (incidentally, benefiting the SPAM web site by providing an advertising "hit" for the web site), and the like.

Filters have also been used or proposed to remove junk e-mail messages from a recipients e-mail. In fact, various programs have been developed in an attempt to filter-out junk e-mail messages from in boxes. Such programs appear to focus upon the e-mail address, host source, the format of the message, the content, and the like. Typically such programs are programmed by the user to detect junk e-mail, and to automatically delete them so the user is not bothered by them, or automatically put into a junk folder. A drawback to such programs is that the user is forced to determine the criteria for filtering, a complicated task for the average user. Another drawback to such programs is that the filters defined by the user, or pre-set may filter-out legitimate bulk e-mail messages that are of interest to the user, for example, e-mail messages from special interest groups, product recall and product warning notices, valuable product promotions from legitimate businesses, complementary upgrade notices and bug patches for software programs, freebees, and the like.

One company developing products to enhance the use of filtering techniques has been Bright Light Technologies in San Francisco. The Bright Light system appears to disclose providing a central clearing house of identified SPAM messages. Bright Light appears to use the SPAM data to form data files which are downloaded to Bright Light subscribers. The subscribers utilize the data files to create filters within their e-mail programs that then filter-out SPAM messages.

Bright Light appears to gather SPAM data by setting up dummy or "probe" e-mail accounts with e-mail providers, for example, Juno.com, Excite.com, or the like. When these dummy accounts receive e-mail messages, Bright Light appear to automatically or manually determine whether the e-mail is SPAM. If the e-mail message is determined to be SPAM, characteristics of the e-mail message, such as sender and the subject text appear to be entered into the SPAM data file.

One drawback with the current Bright Light technique is that automatic determination of SPAM may require a high level of AI programming and programming resources. Another drawback is that manual determination of SPAM may require round-the clock hiring of personnel and personnel resources.

Yet another drawback with the current Bright Light technique is that use of such dummy or probe e-mail accounts are passive do not receive SPAM as would active e-mail accounts. It is well known that electronic mass marketers use a variety of techniques for obtaining e-mail address lists than just who has an e-mail account. For example, marketers obtain e-mail address from user posts on various Internet sites such as news group sites, chat room sites, or directory services sites, message board sites, mailing lists, and identifying "mailto" address links provided on web pages. Using these and other similar methods, electronic mass marketers may effectively obtain large numbers of mailing addresses, which become targets for their advertisements and other unsolicited messages. Mere passive accounts would thus not have the same exposure to such mass marketers, as would e-mail accounts of real live web users. As a result, a reduced number of SPAM e-mail messages may be sent to such dummy or probe accounts.

From the above, it is seen that an improved technique for removing and preventing repeat junk e-mail messages is highly desired.

SUMMARY OF THE INVENTION

According to the present invention, a technique for removing junk e-mail messages from a system of computers over a wide area network is provided. In an exemplary embodiment, the present invention provides a technique for easily viewing and removing SPAM without opening it. The technique can permanently remove the SPAM in some embodiments. The technique also provides for enforcement and reporting of SPAM to SPAM policing servers.

In a specific embodiment, the present invention provides a system for policing an unsolicited e-mail communication. The system has a plurality of clients, each coupled together using a wide area network of computers, such as the Internet or an internet. Each of the clients is adapted to send an indication of an unsolicited e-mail message (or forward the e-mail message) through an e-mail device for a display. The system also has a policing server coupled to each of the plurality of clients through the wide area network of computers. The policing server is adapted to receive the indication from at least one of the clients. The e-mail device comprises an SPAM icon on the display. The SPAM icon is adapted to send the indication from the client to the policying server.

Numerous advantages are achieved by way of the present invention over conventional techniques. As merely an example, the present invention provides an easy to use method to remove unwanted or unsolicited e-mail messages. In some embodiments, the present invention is relatively easy to implement using pre-existing computer software. The present invention also is time efficient and relatively cost efficient. The computer codes also allows a user to permanently remove unwanted e-mail messages from a distribution list. Depending upon the embodiment, one or more of the advantages are achieved. These and other advantages are described throughout the present specification, and more particularly below.

These and other embodiments of the present invention, as well as its advantages and features are described in more detail in conjunction with the text below and attached

DESCRIPTION OF THE SPECIFIC EMBODIMENTS

I. System Hardware

Figure 1:
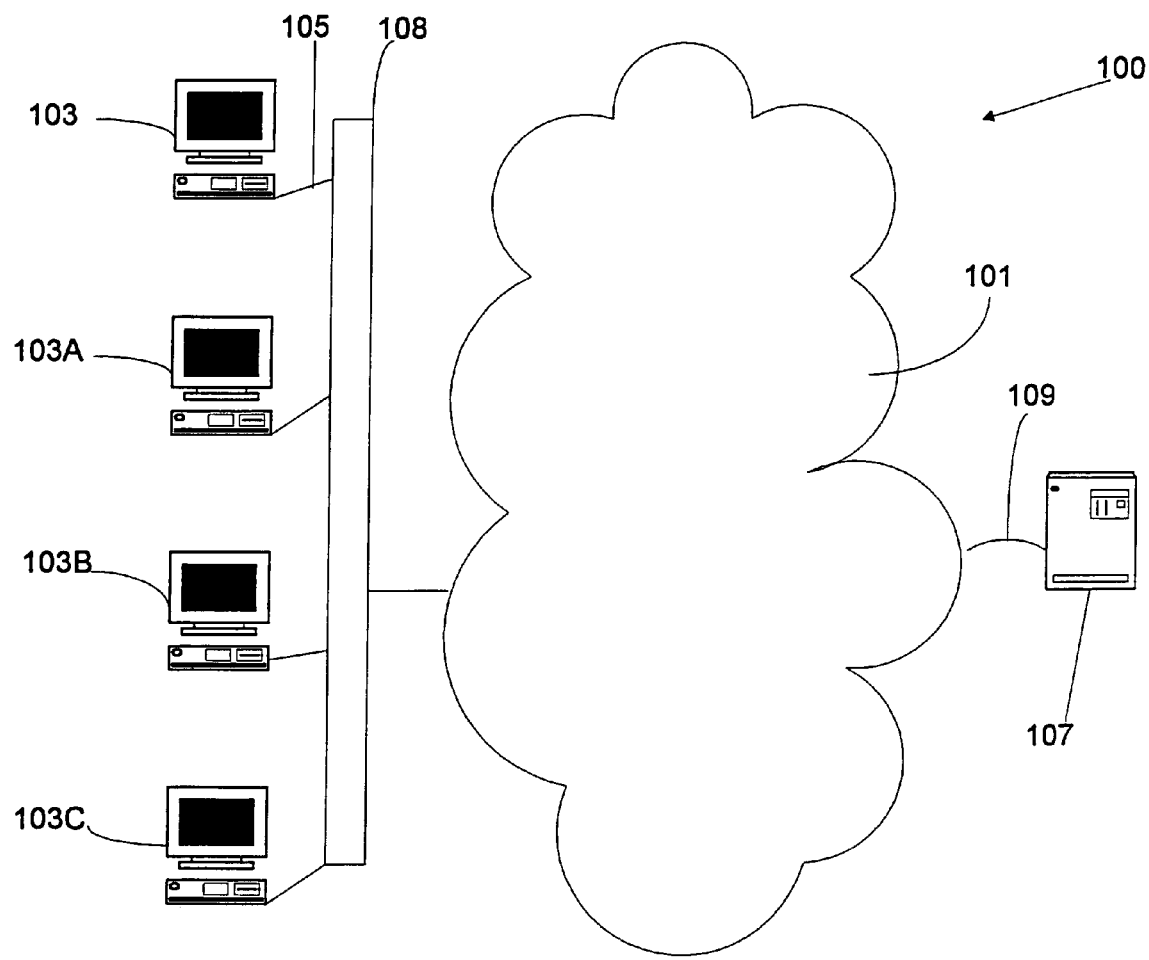
FIG. 1 is a simplified block diagram of an e-mail system according to an embodiment of the present invention.

FIG. 1 is a simplified block diagram of an e-mail system 100 according to an embodiment of the present invention. This diagram is merely an illustration and should not limit the scope of the claims herein. One of ordinary skill in the art would recognize other variations, modifications, and alternatives. Among other features, the system 100 is a wide area network of computers such as, for example, the Internet. The network of computers includes workstations or computer terminals 103, which can be IBM compatible personal computers (i.e., PCs), workstations, network computers (i.e., NCs), remote computing devices, television sets, set-top boxes or other computer-like devices. These computers are coupled through lines 105 to the Internet 101, which includes a variety of servers and other computers. As merely an example, one of the servers is shown as server 107.

Server 107 can be any suitable server that distributes unsolicited advertisements such as junk mail. Server 107 is coupled to the Internet through line 109, which can be through an internet service provider, which is commonly known as an ISP. Server 107 often includes sufficient memory to store information such as advertisements and the like. The memory can also store an e-mail distribution list. The memory can be based on a hard drive, a floppy drive, tape, or other storage media. Of course, the type of memory used depends upon the application.

The e-mail distribution list can include e-mail addresses to one of a plurality of computers 103A, 103B, 103C, and 103D, which can correspond to users. The e-mail distribution list is often compiled from other e-mail distribution lists that are often accumulated from other servers or even purchased. The e-mail distribution list can also be formed by adding the e-mail addresses of users of selected sites. E-mail distribution lists can often range in hundreds, thousands, or even millions of users. As merely an example, a typical e-mail distribution list is often about thousands or even millions of e-mail names and greater. Of course, the type of e-mail distribution list depends upon the application.

Each of these computers can be at a user site such as a home, corporate address, or remote location. Periodically, each of these computers receives an unsolicited e-mail message such as an advertisement from server 107 or a plurality of servers. Literally hundreds, thousands, or even millions of unsolicited e-mail messages can be sent to one or more of the computers by way of the Internet from one or more servers. Given the efficiency of the e-mail system of the Internet, the user of the computer can receive many e-mail messages from a large number of servers. These servers can send desirable advertisements as well as many undesirable advertisements. As merely an example, the advertisement can be for a car, a book, or other consumer products. Additionally, the advertisement can be for "sensitive material" such as an adult Web Site or other materials. The present invention provides a technique to remove these unwanted e-mail messages in an efficient way. Before discussing details of the present invention, details of a computer according to the present invention are shown by way of FIG. 2 below.

Figure 2:
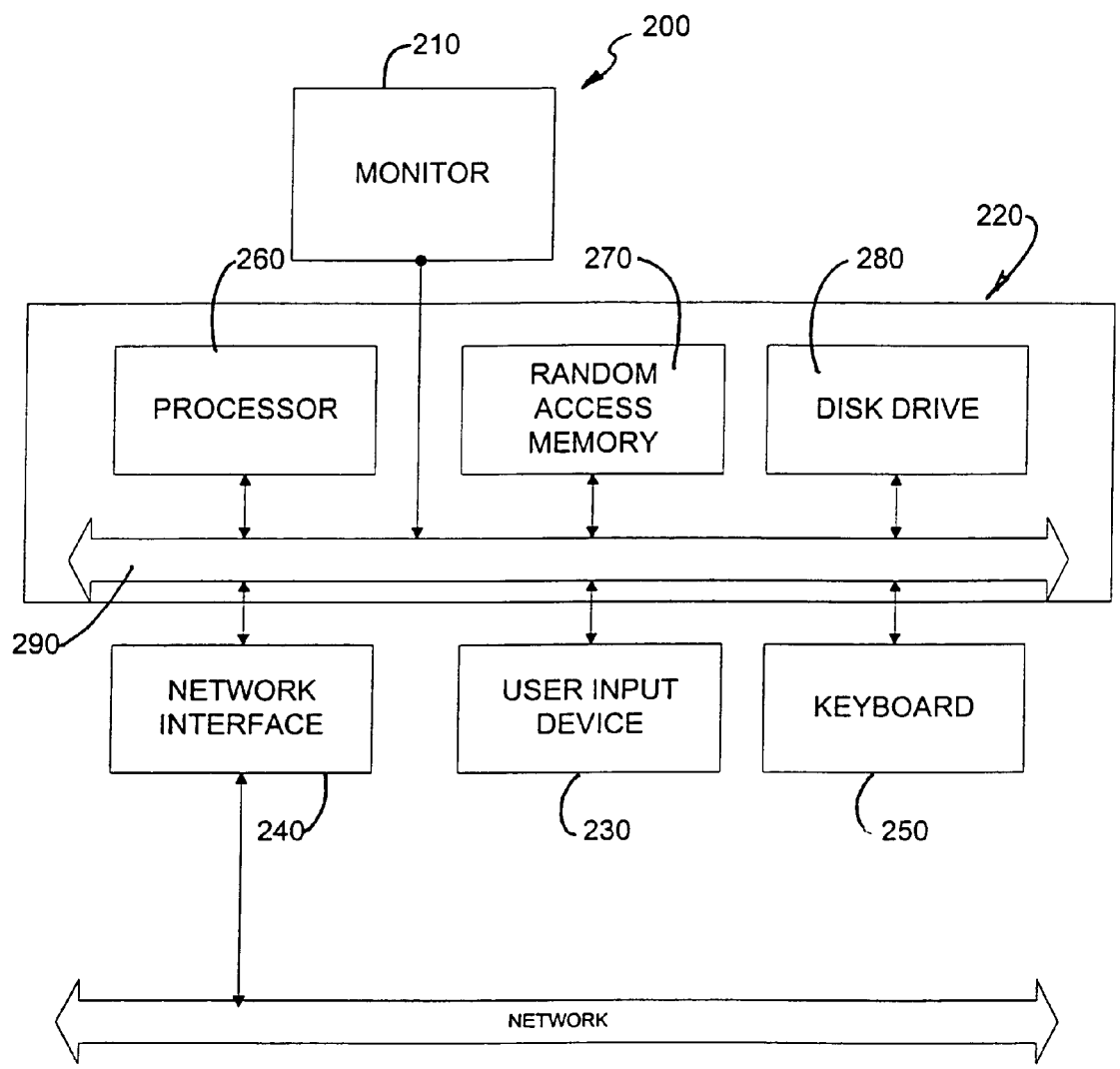
FIG. 2 is a simplified block diagram of a display according to an embodiment of the present invention.

FIG. 2 is a simplified block diagram of a system 200, according to an embodiment of the present invention. This diagram is merely an illustration and should not limit the scope of the claims herein. The system 200 includes a monitor 210, a computing system 220, a user input device 230, a network interface 240, and a keyboard 250. Computing system 220 preferably includes familiar components such as a processor 260, and memory storage devices, such as a random access memory (RAM) 270, a fixed disk drive 280, and a system bus 290 interconnecting the above components. User input device 230 may include a mouse, a trackball, a keyboard, a keypad, a joystick, a digitizing tablet, a wireless controller, a microphone, or other input devices.

RAM 270 and fixed disk drive 280 are mere examples of tangible media for storage of computer programs, e-mail messages, audio and/or video data, and code implementing embodiments of the present invention. Other types of tangible media include SRAM, floppy disks, optical storage media such as CD-ROMs and bar codes, semiconductor memories such as flash memories, stick memories read-only-memories (ROMs), ASICs, battery-backed volatile memories, and the like.

Network interface 240 may be any type of interface to a computer network. For example network interface 240 may be a cable/DSL/telephone modem, an Ethernet or fast Ethernet interface, a LocalTalk connection, or the like. As disclosed above, the computer network may be any type of network such as the Internet, an Intranet, an IPX network, private tunnel, local area network (LAN), WAN, and the like.

In a preferred embodiment, computing system 220 includes a microprocessor, such as a Pentium III from Intel Corporation, a K-7 processor from Advanced Microdevices, or the like running Windows98™ operating system from Microsoft Corporation of Redmond, Wash., BeOS, LINUX, or the like.

The embodiment may include an electronic mail (e-mail) client application, such as Netscape Messenger, GroupWise, Eudora, Microsoft Outlook, Pegasus Mail, or another typical e-mail program for reading and managing e-mail. The embodiment may also utilize web-based e-mail providers, such as Hotmail, Yahoo!, Excite, or the like; subscriber-based e-mail providers, such as America On Line (AOL), Compuserve, Prodigy, Microsoft Network (MSN) or the like. Still other embodiments may run with existing e-mail filtering software, such as Spam Wall from Bright Light, and the like.

Many other systems, such as MacOS™ from Apple Corporation, running upon G3 based microprocessors, or Solaris™ from Sun Microsystems or UNIX running upon a SPARCstation, and the like can also be used.

The system above discloses examples of configurations that embody the present invention. It will be readily apparent to one of ordinary skill in the art that many system types, configurations, and combinations of the above devices are suitable for use in light of the present disclosure. Of course, the types of system elements used depend highly upon the application.

In one embodiment of the present invention, a text parsing routine can be implemented and included. In such an embodiment, the text parsing routine automatically parses the junk e-mail message and determines the specified method for removal from the mailing list. For example, the text parsing routine can determine that a junk e-mail message should be "replied to" with the text "remove", "unsubscribe", or the like in the subject line, in the body of the e-mail message, and the like. As another example, the text parsing routine can determine that a junk e-mail message should be forwarded to a specified e-mail address, again with special text such as "delete", "please remove", and the like included therein. As merely another example, the routine can determine that a specific web site should be contacted using a web browser and specific acts performed such as clicking on a button on the web site. Other types of actions are contemplated in alternative embodiments of the present invention and can depend upon the type of removal instructions specified by the junk e-mail message.

In one embodiment, as will be described below, when the user clicks upon the SPAM icon, the junk e-mail message is not only replied to using the user's e-mail program, but is also deleted or purged from the user's in box. The e-mail message may also be forwarded to a centralized clearing house of SPAM messages, called a SPAM policing server or policing server. Thus with a single click of the remove icon, a request for removal from the e-mail mailing list is generated and the message is deleted. In some embodiments, the e-mail message is transferred to trash.

In another embodiment, when a junk e-mail has been removed by selecting the SPAM command or by clicking on the SPAM icon, a log is maintained of the incoming junk e-mail message, the source of the junk e-mail message, the product advertised in the e-mail message, or the like. Further, a log is maintained as to when the reply e-mail, to whom the reply e-mail is sent to, actions taken, or the like. Such logs are valuable as to tracking junk e-mails and to demonstrate whether the requests for removal have been respected. If a junk e-mail source repeatedly ignores removal requests, the logs may provide grounds for ISPs to terminate junk e-mail sender's accounts, may provide evidence to governmental authorities, and the like. In still another embodiment, the logs may be forwarded to the policing server for further action.

In light of the disclosed embodiments, enhancements to the present invention are envisioned. For example, it is envisioned that users will be able to define custom actions and assign such actions to custom icons for display on the e-mail system. Some examples of custom user interfaces are shown below.

II. User Interfaces

Figure 3:
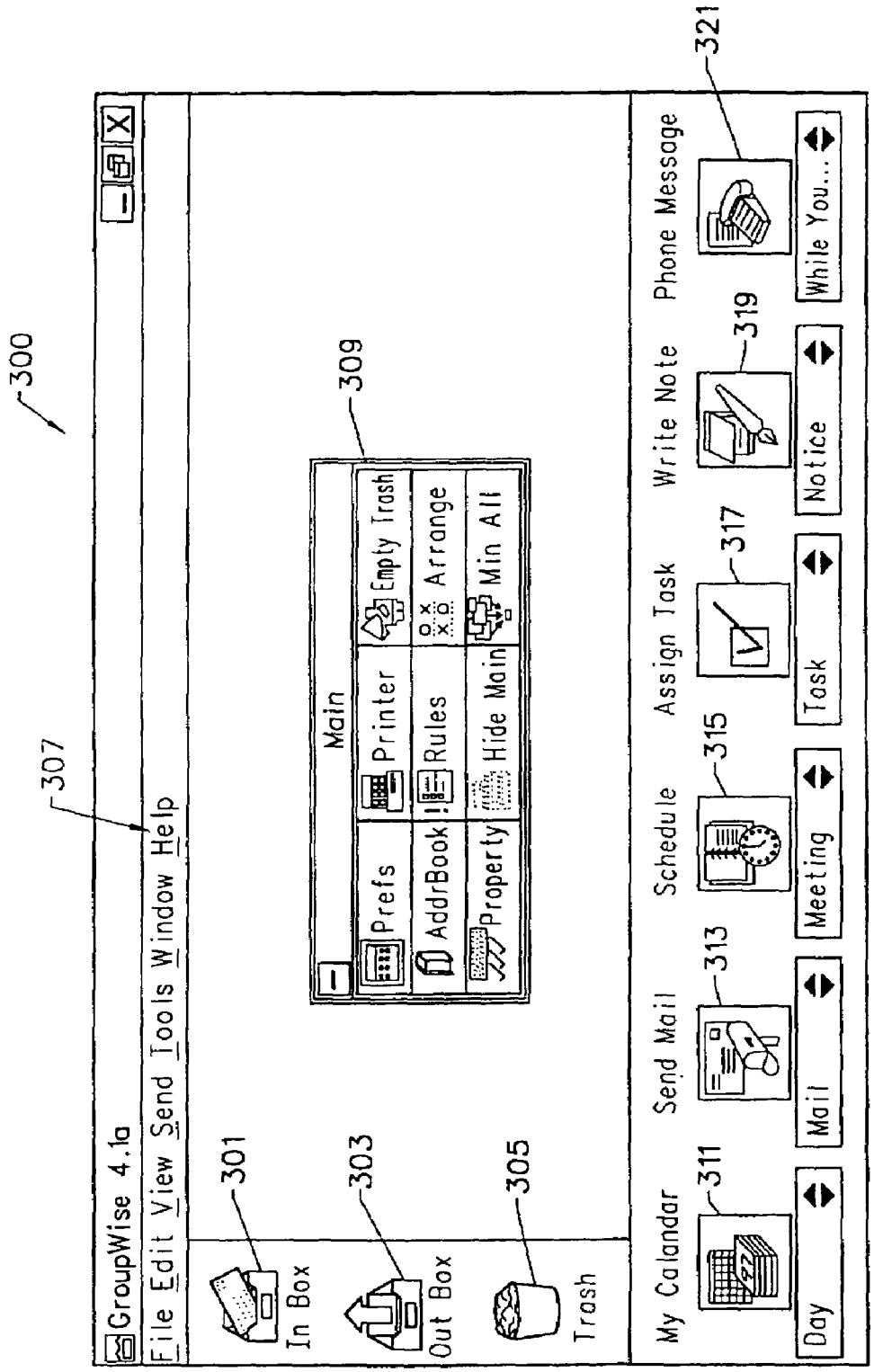
FIG. 3-5 are simplified user interfaces according to embodiments of the present invention.
Figure 4:
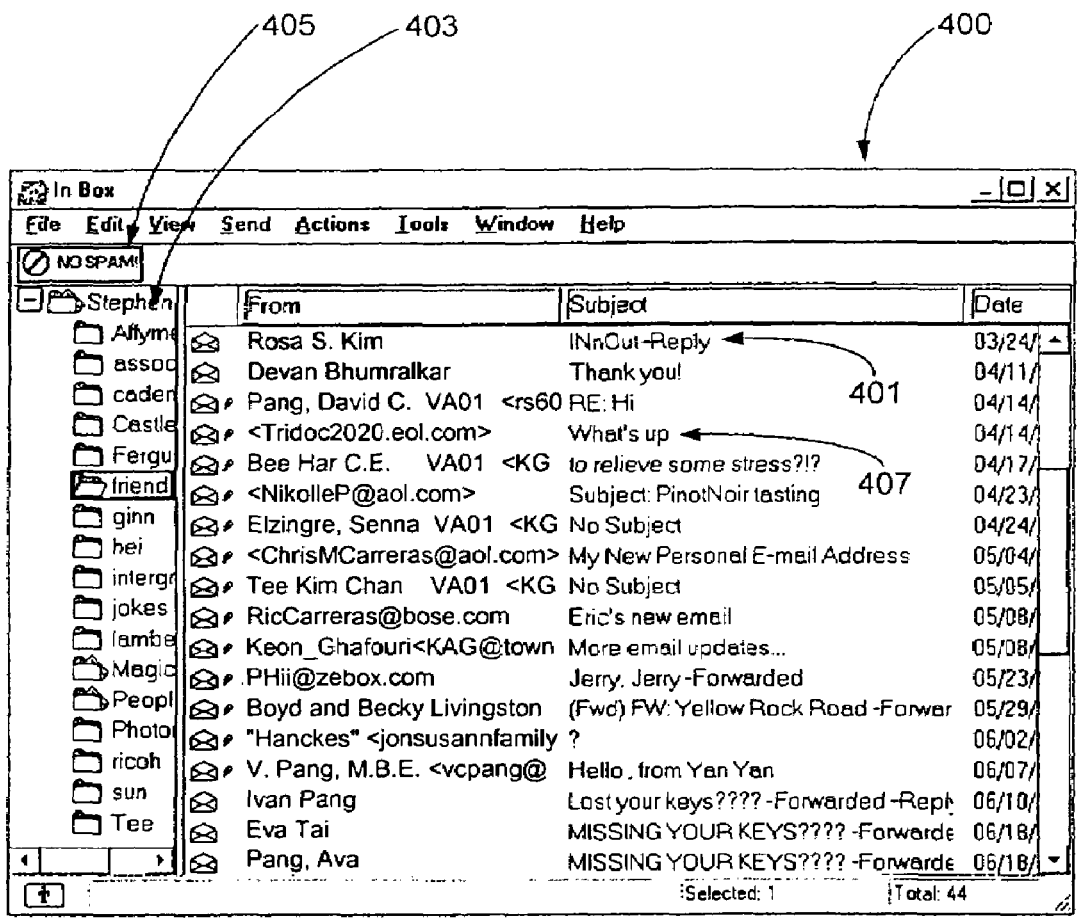
Figure 5:
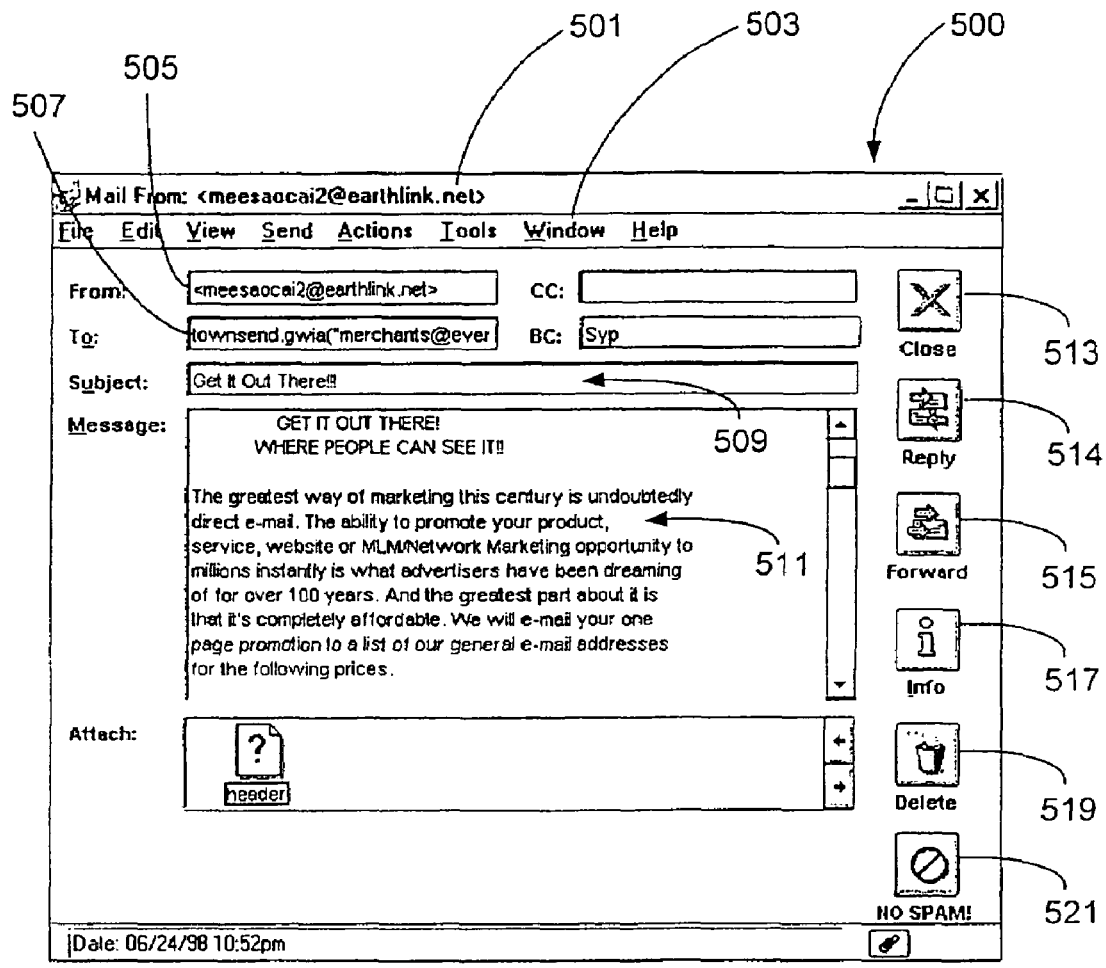

FIG. 3-5 are simplified user interfaces according to embodiments of the present invention. These diagrams are merely illustrations and should not limit the scope of the claims herein. One of ordinary skill in the art would recognize other variations, modifications, and alternatives. As merely an example, FIG. 3 shows a graphical user interface 300 for an e-mail system according to an embodiment of the present invention. The graphical user interface 300 is one of many, if not the first, window for the e-mail system. The user interface includes a variety of features such as a tool bar 307 that has at least features directed to File, Edit, View, Send, Tools, Window, and Help prompts.

Additionally, the interface includes an in-box 301, an out-box 303, and a trash can 305. As shown, the in-box, out-box, and trash can be accessed by way of a mouse cursor positioned over a respective icon which allows entry. The e-mail also has a main menu 309, and a lower group of icons for accessing a calendar 311, a send mail program 313, a schedule program 315, a task program 317, a note program 319, and a phone message program 321. Details of these particular features can be found in one of many conventional e-mail systems such as, for example, GroupWise by Novell as well as other e-mail systems.

The present invention allows for easy viewing and removal of junk e-mail messages or SPAM by first entering the in-box 301. The in-box is entered by clicking a cursor by way of a mouse onto the in-box icon. Once the in-box is accessed, a graphical user interface such as the one 400 shown in FIG. 4 is displayed. The in-box user interface includes a variety of elements such as a root directory 403, which is in the name of "Stephen" for example. The root directory includes a variety of sub-directories such as "friend" for example. As shown, the friend directory is highlighted by way of an outline. The friend directory is also open, as shown by the opened file folder. The friend directory receives a variety of e-mail messages which are sent to the main directory or directly to the friend directory. As shown, the e-mail messages come from "real" friends of the user or receiver such as the names listed, including Rosa S. Kim, Diane H. Elzingre, and others. Additionally, the friend directory includes junk mail, non-solicited mail, or SPAM, as shown by the line item corresponding to "What's up" 407, which is from Tridoc2020@aol.com. The SPAM has not been opened but can be easily identified by the user or recipient by the unknown e-mail name and message.

In the present embodiment, the user can remove the SPAM by simply clicking on the "NO SPAM!" icon 405, which is disposed around the periphery of the graphical user interface. The periphery of the graphical user space is outside of the region for the main text or body of the e-mail message. In some embodiments, the periphery of the graphical user interface is a portion of a tool bar, for example, which is easy to access but substantially out of the way of the text. In still another embodiment, the user may have the option to select a "NO SPAM" function by right-clicking upon the e-mail message. Here, the icon is displayed simultaneously with the many lines of e-mail messages, including titles and senders. The NO SPAM button removes the e-mail message or disposes the e-mail message into the trash.

In the present embodiment, the NO SPAM button also sends a reply to the sender, which is Tridoc2020@aol.com. The reply sends a message such as a "remove" term or similar term or terms which indicates that the receiver of the SPAM or Stephen in the present example would like to be removed from the spammer's distribution list. Other forms of requests are envisioned such as entering "remove" or similar term on a subject line, or in a body of an e-mail message, or the like. In this embodiment, an e-mail message may also be sent to a SPAM policing server to indicate the receipt of a SPAM by the recipient.

By way of the present user interface, the SPAM is removed without even opening it. The present user interface is easy to use, by way of a simple position and click, and permanently removes the receivers name from the SPAM distribution list. Accordingly, the receiver will not receive SPAM from the SPAM mailing list of Tridoc2020@aol.com, as long as the user's name is permanently removed from the distribution list.

In an alternative embodiment, the receiver of SPAM reads the SPAM message before removing it by way of a novel graphical user interface 500 or window shown in FIG. 5. This graphical user interface includes a variety of features such as a tool bar 503, sender field 505, receiver field 507, subject line 509, and e-mail message 511, which is SPAM. The interface also includes icons for closing the window 513, replying to the sender 514, forwarding the e-mail 515, information 517, deleting the e-mail 519, and others. The interface also includes an icon labeled "NO SPAM!" for permanently removing the SPAM.

The NO SPAM! button removes the e-mail message or disposes the e-mail message into the trash. The NO SPAM! button also sends a reply to the sender, which is meesaocai2@earthlink.net 501. The reply may send a message such as a remove term which indicates that the receiver of the SPAM or Stephen would like to be removed from the spammer's distribution list using meesaocai2@earthlink.net. In this embodiment, an e-mail message may also be sent to a SPAM policing server to indicate the receipt of a SPAM by the recipient.

By way of the present user interface, the SPAM is removed after opening it. The present user interface is easy to use, by way of a simple position and click, and permanently removes the receivers name from the SPAM distribution list. In another embodiment, the user may have the option to select a "NO SPAM" function by right-clicking upon the e-mail message. Accordingly, the receiver will not receive SPAM from the SPAM mailing list of meesaocai2@earthlink.net 501, if the spammer permanently removes the receives name from the distribution list, and if the SPAM police server updates its filter data files.

Although the above embodiments are shown by way of specific user interfaces, the present invention is much broader. In particular, the present invention can be applied to other e-mail systems and other types of interfaces. The invention can also be added to pre-existing systems without significant limitations or the like. The invention is shown, in part, by the SPAM! icon, but is not limited. The present invention merely provides an easy to use technique for removing SPAM, removing the user's name of a spammer's e-mail distribution list, and for reporting the SPAM to a SPAM policing server. Details with regard to specific methods according to embodiments of the present invention are shown below.

III. Present Methods

FIGS. 6-9 are simplified flow diagrams according to embodiments of the present invention. These diagrams are merely illustrations and should not limit the scope of the claims herein. One of ordinary skill in the art would recognize other variations, modifications, and alternatives.

Figure 6:
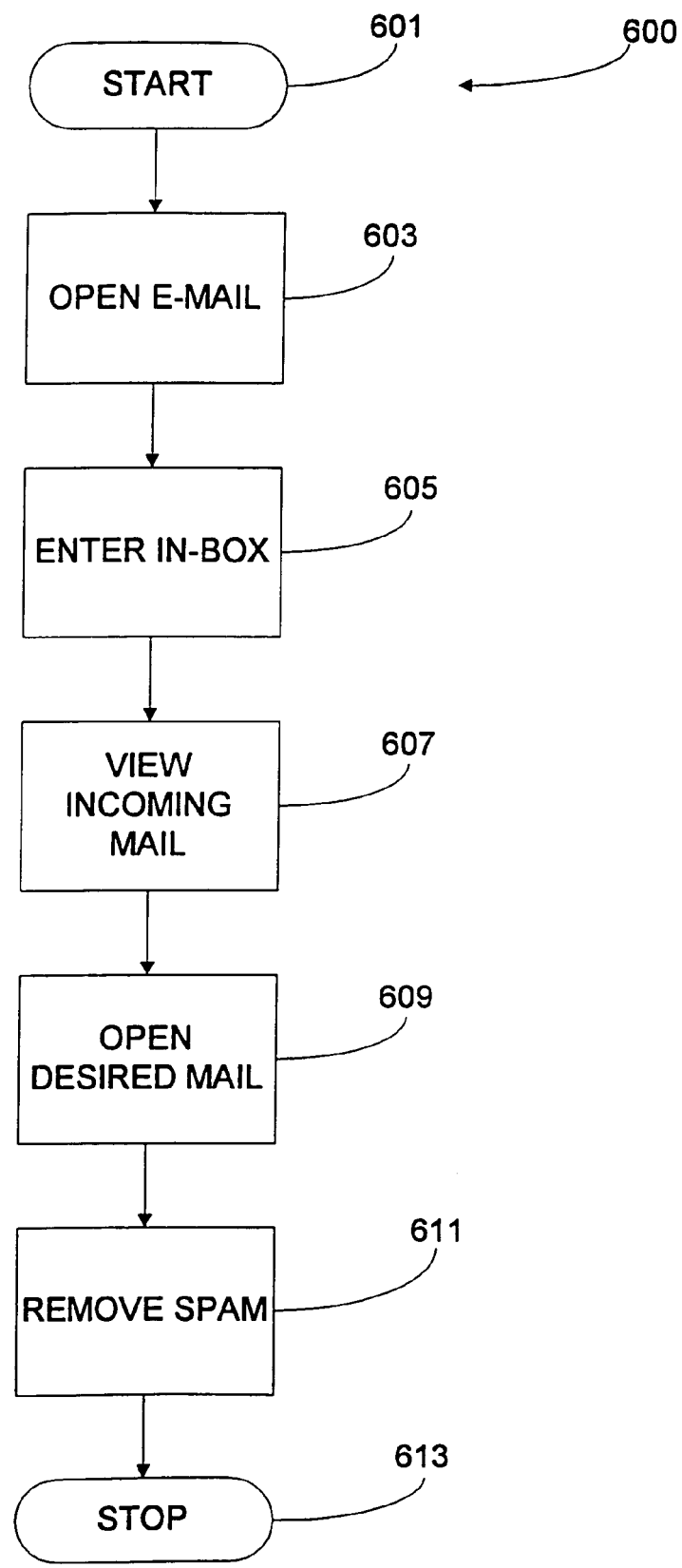
FIGS. 6-9 are simplified flow diagrams according to embodiments of the present invention.

In one embodiment, the process 600 begins with start 601, as shown in FIG. 6. Among other processes, a user of the computer may perform a variety of operations. These operations include word processing, spread sheets, and others. The user also checks his/or e-mail box (step 603). In the present embodiment, this may include running an e-mail client program, accessing a web-based e-mail page, opening a subscription e-mail account, or the like.

Next, the user selects one of many functions that are available on e-mail. In some embodiments, the e-mail has an in-box and an out-box. In a preferred embodiment, the user opens or enters the in-box, step 605. In particular, the user positions a cursor over an icon and clicks on the icon. The icon opens the in-box. Alternatively, the user uses a "hot key" to open the in-box. Other techniques can also be used to open the in-box.

Once the in-box is opened. The user typically views the pending e-mails by sender and subject. In most embodiments, the user views (step 607) lines of e-mails that have been sent to the user e-mail address. The lines of e-mail contain both legitimate e-mail messages from friends, family, and business. Other e-mail messages include unsolicited advertisements, junk mail, and the like, which are referred herein as SPAM. The user opens desired e-mail messages (step 609) and disposes of them based. For example, the user can delete the e-mail messages, archive the messages, forward the messages, reply to the messages, or perform other functions.

Further, based upon the subject and/or the sender, the user may determine that the e-mail message is SPAM, and "remove" the SPAM (step 611) before even opening it. In a specific embodiment, the SPAM is removed. Depending upon the embodiment, the SPAM can be removed by way of a variety of ways, as will be described below. The process ends at step 613, which is STOP.

Figure 7:
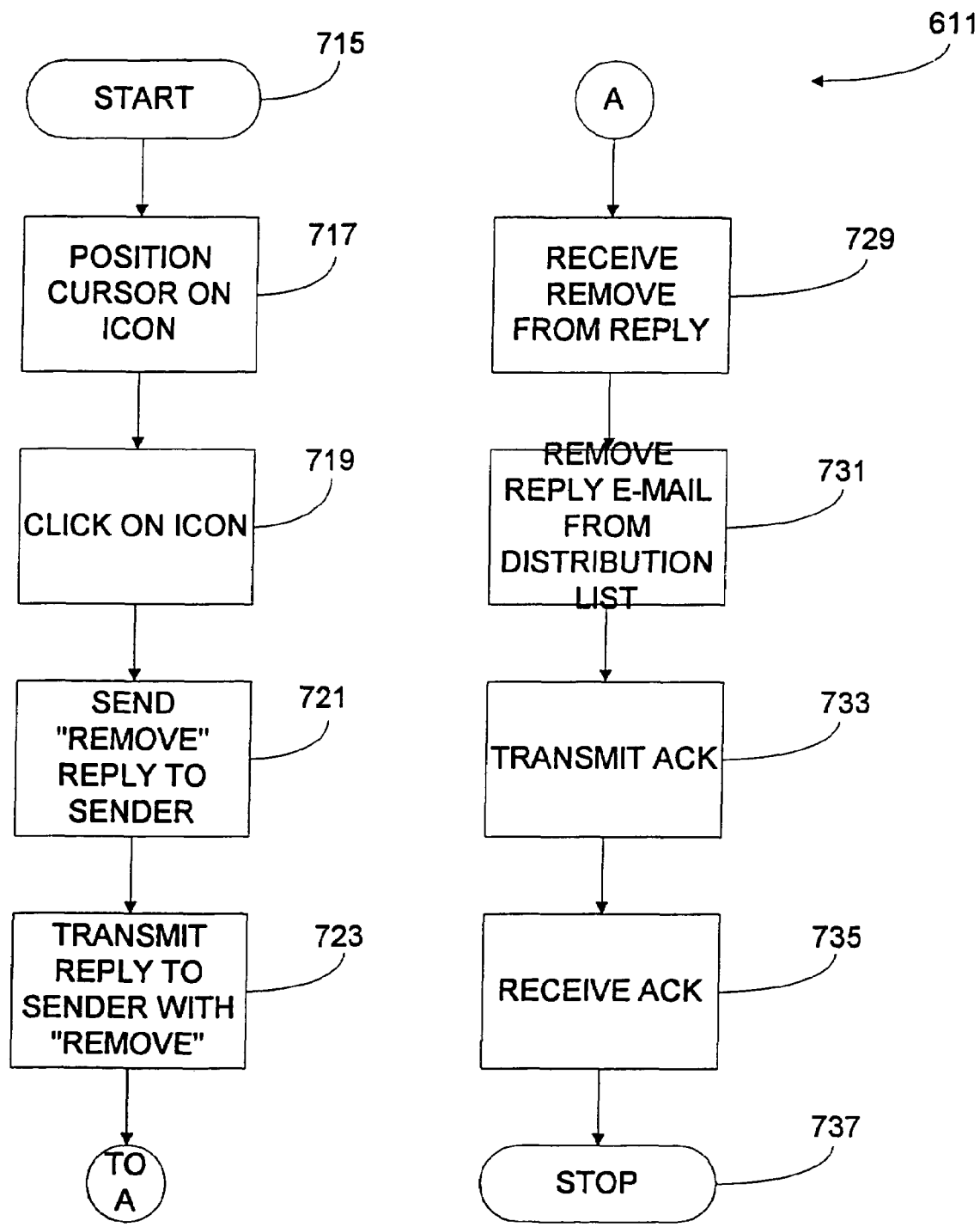

In a specific embodiment, the present invention provides a process for removing SPAM, as shown by the flow diagram 611 of FIG. 7. After the user selects the SPAM, the user positions a cursor in front of an icon 717, which can be a NO SPAM, SPAM, remove icon or the like such as the ones shown above. The user then clicks the icon (step 719), which begins a process to remove the SPAM from the user's in-box, removes the user's name from an e-mail distribution list, reports the SPAM to a SPAM policing server, as well as other functions. In particular, the process generates (step 721) an e-mail reply to the spammer or distributor of the e-mail with a remove request. The e-mail reply is transmitted (step 723) to the sender via the wide area network of computers or Internet. By way of the present process, the user can click onto an icon to remove the SPAM, send a remove reply to the sender to permanently remove the name of the user from a junk mail e-mail distribution list, and report the SPAM.

Once the spammer or sender receives the remove reply message (step 729) via the wide area network of computers or Internet. The sender generally receives such remove reply via e-mail message or other technique. The sender then removes (step 731) the name of the user or recipient from the e-mail distribution list or the like from memory in a server, for example. This occurs manually or automatically according to a specific process.

In this embodiment, once the user name is removed, an acknowledgment message (step 733) can be sent to the user by way of e-mail. The e-mail message traverses through the wide area network of computers or Internet and ends up in the users e-mail box. Here, the user receives (step 735) the acknowledgment which can be a "ACKNOWLEDGE REMOVE" language or other information. The present process then stops, step 737.

Figure 8:
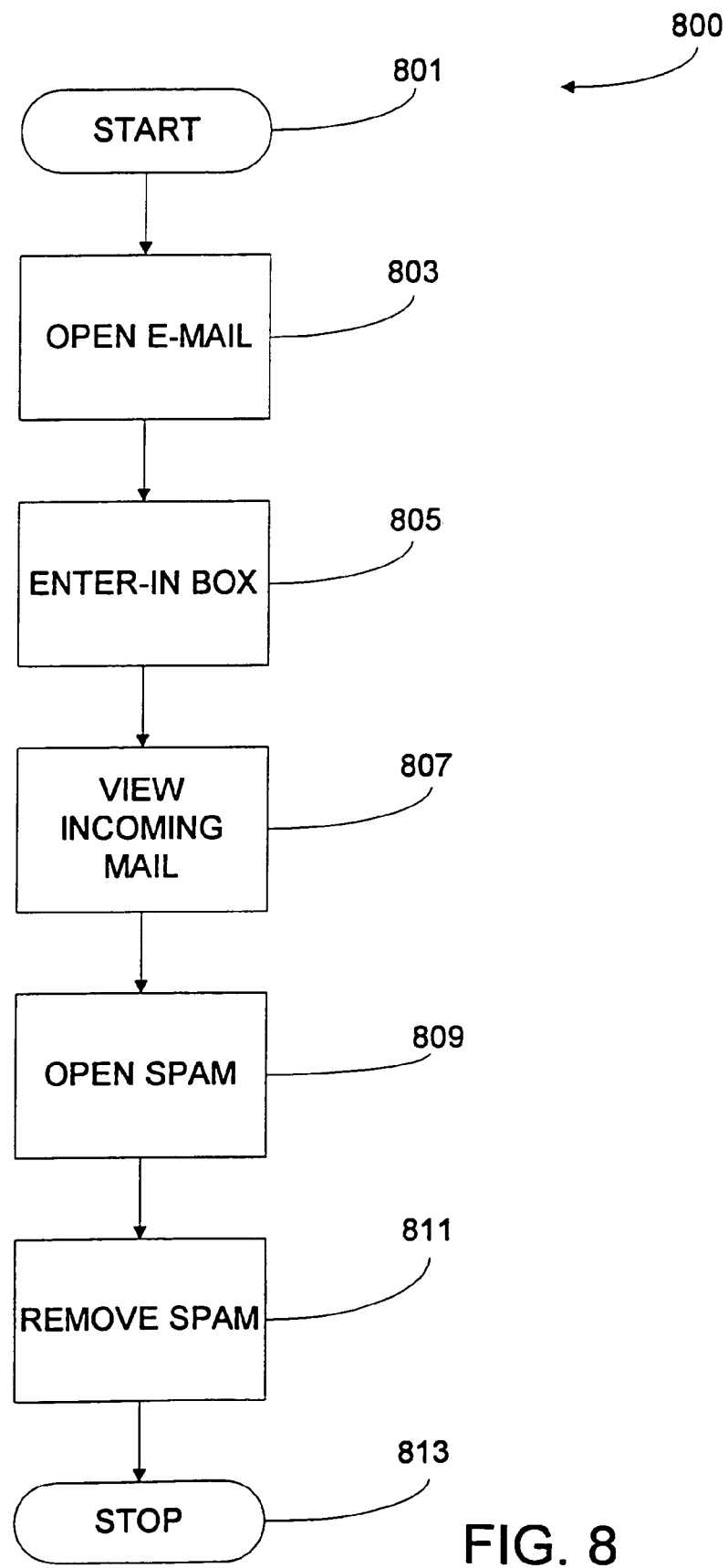

An alternative embodiment is shown by FIG. 8. The process begins with start 801, as shown in FIG. 8. Among other processes, a user of the computer may perform a variety of operations. These operations include word processing, spread sheets, and others. The user also checks his/or e-mail (step 803). In the present embodiment, this may include running an e-mail client program, accessing a web-based e-mail page, opening a subscription e-mail account, or the like.

In the present embodiment, the user selects one of many functions that are available on e-mail. In some embodiments, the e-mail has an in-box and an out-box. In a preferred embodiment, the user opens or enters the in-box, step 805. In particular, the user positions a cursor over an icon and clicks on the icon. The icon opens the in-box. Alternatively, the user uses a "hot key" to open the in-box. Other techniques can also be used to open the in-box.

Once the in-box is opened. The user typically views the pending e-mails. In most embodiments, the user views (step 807) lines of e-mails that have been sent to the user e-mail address. The lines of e-mail contain both legitimate e-mail messages from friends, family, and business. Other e-mail messages include unsolicited advertisements, junk mail, and the like, which are called SPAM. The user opens desired e-mail messages and disposes of them. For example, the user can delete the desired e-mail messages, archive the messages, forward the messages, reply to the messages, or perform other functions. In a preferred embodiment, the user also opens the SPAM e-mail message (step 809).

Here, the user can read the SPAM and determine if it is desirable to keep the SPAM or permanently remove it. In a typical household, the user finds that the SPAM is an adult Web Site, a get-rich-quick scheme, or the like. Next, the user, or recipient "removes" the SPAM (step 811). Depending upon the embodiment, the SPAM can be removed by way of a variety of ways. The process ends at step 813, which is STOP. Processing by the SPAM policing server will be described below.

Figure 9:
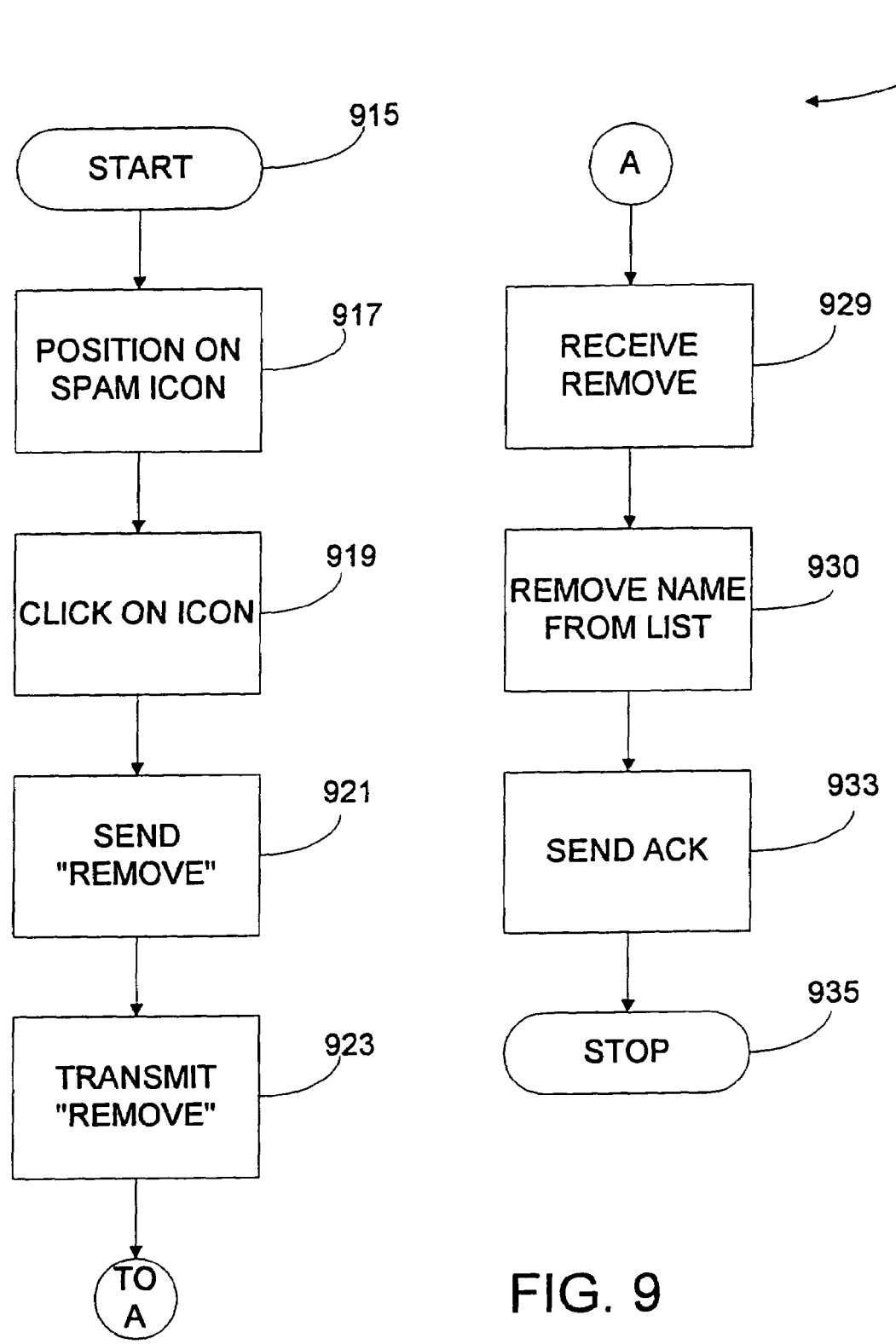

In a specific embodiment, the present invention provides a process for removing SPAM, as shown by the flow diagram 900 of FIG. 9. The process begins with start, step 915. After the user views the SPAM message, the user positions a cursor in from of an icon 917, which can be a SPAM icon or the like such as the ones described herein, but can be others. The user clicks onto the icon (step 919), which begins a process to remove the SPAM, remove the user's name from an e-mail distribution list, reports the SPAM to a SPAM policing server, as well as perform other functions. In particular, the process sends (step 921) an e-mail message to the spammer or distributor with a "remove" request. The e-mail message is transmitted (step 923) to the spammer via the wide area network of computers or Internet. By way of the present process, the user can click onto an icon to remove the SPAM, to send a remove reply to the sender to permanently remove the name of the user from a junk mail e-mail distribution list, and to send the SPAM to a SPAM policing server.

The spammer or sender receives the remove reply message (step 929) via the wide area network of computers or Internet. The sender generally receives such remove reply via e-mail message or other technique. The sender then removes (step 930) the name of the user from the e-mail distribution list or the like from memory of a server, for example. This occurs manually or automatically according to a specific process. Once the user name is removed, an acknowledgment or confirmation message (step 933) can be sent to the user by way of e-mail. The e-mail message traverses through the wide area network of computers or Internet and ends up in the users e-mail box. The present process then stops, step 935. Processing by the SPAM policing server will be described below.

The present methods can be implemented in computer codes, where the codes can be separated or combined with others. Additionally the methods can be in the form of computer software and/or hardware. The software can be separated or combined. Additionally, the software can be combined with hardware, which can be combined or separated. As merely an example, the present invention can use, for example, computer code in the form of macros from an e-mail program such as GroupWise, for example. The macros can be shown below.

```
Application (A1, "WPOffice"; Default; "US")
ItemReply (ReplyTo: Sender!; IncludeText: No!)
FocusSet (Place: Subject!)
DeleteWordRight ( )
Type (Text: "REMOVE")
ItemSend ( )
ItemDeleteOpenItem ( )
```

The codes shown above are merely examples and should not limit the scope of the claims herein. One of ordinary skill in the art would recognize other variations, modifications, and alternatives.

In another embodiment of the present invention, the computer code is also in the form of macros from an e-mail program such as GroupWise, for example. The following macro illustrates deletion of the SPAM, sending of a remove request to the spammer, and updating of the user's built-in e-mail filtering capability. In particular, sets the e-mail filter to filter-out e-mail messages from the same sender. The macros can be shown below.

```
Application (A1; "WPOffice"; Default; "US")
Declare(SourceMessageID) //* ID of read message
Declare(ReplyMessageID) //* ID of reply message
Declare(SpammerID) //* String of message source
Declare(UserID) //* String of user's ID
Declare(ReportToID) //* String of reporting address
Declare (DocName) // Save File Name truncated
Declare(RuleMessage) // Rule message
Declare(RuleSubject) // Rule Subject
Declare (RuleName) //* Rule name
Declare(RuleMessageText) //* Rule filters text in message
Declare(ReplySubject) //* Rule Subject
ReportToID:="SPAM policing server //* report to SPAM policing server
UserID:="SYP" //* for test purposes
//* RuleName:="spamfilter" //* test
RuleMessageText:="spam" //* test
RuleSubject:=" - REMOVE" //* Rule reply subject line
RuleMessage:="Sender has previously requested removal from your e-mail
distribution list. You have not honored that request and thus are in
violation of __ U.S.C.___, as well as other Federal Regulations. You are
subject to $500 fine for this violation, and you are being reported to
Federal and State Authorities." //* Message for rule filter
ReplySubject:=" - REMOVE"
ItemRead ( ) //* Open message in in-box
```

-continued

```
SourceMessageID:=ItemMessageIDFromView ( ) //* Set Source ID
SpammerID:= ItemGetText(SourceMessageID;From!) //*
Source of message
RuleName:=SubStr(SpammerID;1;6) //* use truncated sender name as
the rule name
ItemReply (ReplyTo: Sender!; IncludeText: No!) //* Reply to message
ReplyMessageID:=ItemMessageIDFromView ( ) //* Set Reply ID
TextSetSubject(ReplySubject;True) //* Generate removal request e-mail
subject line
ItemSend( ) //* Sends the reply e-mail
ItemArchive(SourceMessageID) //* Save a copy of the spam
ItemDeleteOpenItem( ) //* Delete the spam!
//* Next we set a new rule in response to the SpammerID
RuleCreate(;RuleName;NewItem!;Inbox!;No!;Yes!;No!;No!;No!;;;;;
RuleMessageText(;;;;;;;;;;;;;;;;;;;;;;;;;;;;;;;;;;) //* Creates new rule
RuleAddActionArchive(;RuleName)
RuleAddActionReply(;RuleName;ToSender!;ReportToID;;RuleSubject;;
RuleMessage;UserID;) //* Rule creates automatic reply e-mail
//* RuleAddActionArchive(;RuleName) //* if archival desired
RuleAddActionEmptyItem(;RuleName) //* Rule deletes repeat spam
```

The codes shown above are merely examples and should not limit the scope of the claims herein. One of ordinary skill in the art would recognize other variations, modifications, and alternatives.

IV. Reporting Embodiments

Figure 10:
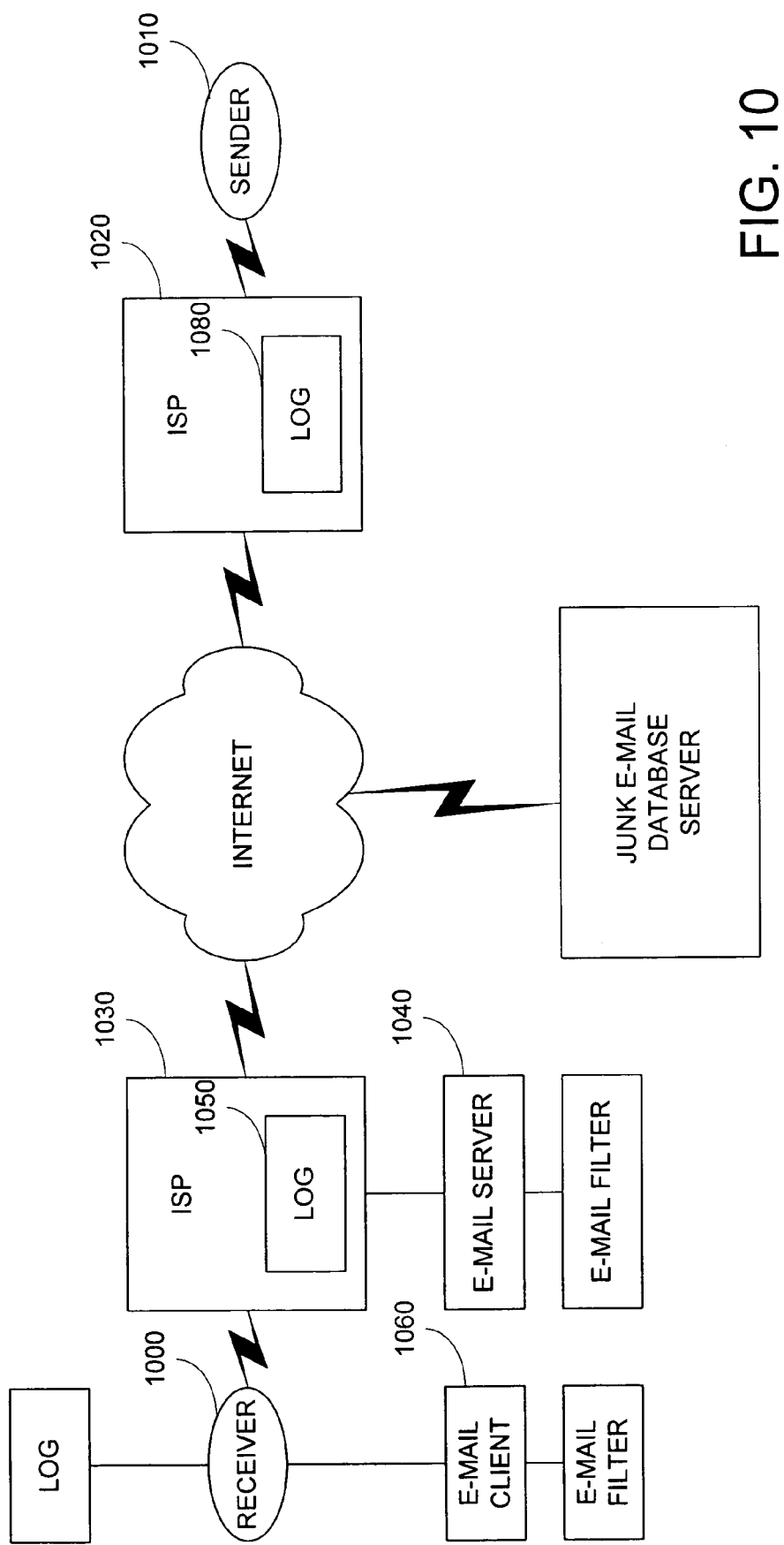
FIGS. 10-11 are simplified diagrams according to other embodiments of the present invention.

FIG. 10 illustrates a simplified reporting embodiment of the present invention. FIG. 10 illustrates a recipient at computer system 1000, a sender 1010 of unwanted e-mail, a sender ISP 1020 and a recipient ISP 1030. Recipient ISP 1030 includes a mail server 1040 and a log 1050, computer system 1000 includes a mail client 1060 and a log 1070, and ISP 1020 includes a log 1080.

Sender 1010 is typically coupled to ISP 1020 by any typical network connection such as a dial-up connection, dedicated ISDN line, cable connection, satellite link and other wireless links, and the like. Computer system 1000 is also coupled to recipient ISP 1030 by any conventional network connection mentioned above, as well as other methods that become conventional in the future. Recipient ISP 1030 is coupled to ISP 1020 by the Internet, typically through a number of intermediary machines.

ISP 1020 and recipient ISP 1030 are typically companies that hold themselves out as Internet service providers (ISPs). However it should be understood that ISP 1020 and recipient ISP 1030 refer to any computers that provide e-mail services to senders or recipients. For example, subscription service providers such as America On-Line (AOL), Prodigy, Microsoft Network (MSN), and the like are considered ISP within the scope of embodiments of the present invention.

Typically, a recipient at computer system 1000 receives an unwanted e-mail message using mail client 1060. Mail client 1060 receives this e-mail message from mail server 1040 resident on recipient ISP 1030. Recipient ISP 1030 receives the e-mail message originated from ISP 1020 and sender 1010 through well known methods.

Using the above described embodiment of the present invention, in response to the unwanted e-mail message, the recipient requests removal from the e-mail mailing list with a single user input, such as a click of an icon, by voice command, and the like. In response to the request, the present embodiment logs the e-mail message and the removal request. In some embodiments of the present invention, the log may store and/or archive the entire message, the e-mail address of the sender, a portion of the message, the date, and the like. In alternative embodiments of the present invention, other distinguishing features of the unwanted e-mail can also be logged, such as the address of ISP 1020, and the like.

The date when the user requests removal is also typically logged, although not necessary since the junk e-mail message is already logged. In the present embodiment, logging information is maintained in log 1070 (a database) in computer system 1000 alternatively in separate files within a particular directory, and the like.

When subsequent e-mail messages are "Removed" using embodiments of the present messages, these e-mail messages are compared to previous e-mail messages stored in log 1070. For example, comparison can be on the basis of sender name, e-mail address, telephone number, mail address, and the like. If a match is found, meaning sender 1010 has failed to respect the recipient's previous request to be removed from the senders e-mail list, several different courses of action may be taken.

One action includes notifying the recipient at computer system 1000 of the violation. In such a situation, log 1070 would provide evidence that the recipient previously requested removal from the e-mail mailing list, but was still sent another e-mail. With such evidence, the recipient can contact ISP 1020, for example, to notify ISP 1020 that sender 1010 failed to comply with the recipient's request. ISP 1020 may then terminate sender's 1010 account, or request that sender 1010 complies with requests for removal as a condition of continued service. Typically the relevant portion of log 1070 may be attached to the e-mail.

Another action includes automatically notifying ISP 1020 of sender's 1010 failure to comply with the recipient's request, as described above, using e-mail filters. Such a notification is typically through e-mail. A benefit to this action is that recipient need not perform any special action besides selecting the one-button "removal" embodiment of the present invention. If sender 1010 is deliberately ignoring recipient's requests, ISP 1020 is immediately made aware of this action by, presumably, the large number of reply e-mail messages from recipients. ISP's 1020 incentive to take action, for example, suspending sender's 1010 account, and the like includes being labeled as a junk e-mail ISP.

In yet another embodiment, the notification goes to a government authority or a SPAM policing server. This SPAM policing server keeps logs and keeps track of each notification. When a spammer or a sender violates a rule that has been set-up, the SPAM policing server provides an additional notification to the sender. In some embodiments, the SPAM policing server also sends information out to governmental authorities for enforcement. In still further embodiments, the SPAM policing server sends out information to the ISP 1020 to terminate the sender's account. Still further, the SPAM policing server may utilize software tools that disable ISP 1020 or the spammer's ability to send e-mail messages. Depending upon the embodiment, one or more of the above may take place.

In one embodiment, notification of SPAM to the SPAM policing server may occur when the first SPAM is sent, not necessarily when SPAM from the same source, or the like is detected. In such an embodiment, earlier notice of SPAM may be possible.

In one embodiment, e-mail filtering tools can be included in the present invention to filter-out e-mail messages from junk e-mail ISPs. If it is determined that a threshold number (even one) of e-mail messages are from a particular ISP, and/or particular ISP's are not taking action in response to repeated "removal" requests by their senders, in one embodiment, the user may be prompted to place a particular ISP on a filter-out list, as illustrated above. In such a situation, future e-mails from that ISP will be automatically filtered out of a recipient's in-box. Alternatively, placement of a particular ISP on a filter-out list may occur automatically if the threshold number is exceeded. As an enhancement, it is contemplated that such subsequent e-mail messages are automatically replied to also with "remove" requests, and the like. The subsequent e-mail messages and "remove" requests are typically also logged for evidentiary purposes.

In one embodiment of the present invention, when a threshold number of e-mail messages from a junk e-mail sender or ISP are received, despite the "removal" request, this information is forwarded to a central junk e-mail database server (possibly the same as the SPAM policing server). The information automatically sent may include the relevant portions from log 1070. Because it is envisioned that there is wide acceptance and use of embodiments of the present invention, it is contemplated that the database server would serve as a central clearing house of junk e-mail data. For example, which senders of junk e-mail are the most prolific or ignore the "Remove" requests, which ISPs provide havens for junk e-mail senders, which ISPs do not stop junk e-mail senders, and the like. Such a database can provide valuable information to ISPs, local, state and federal law enforcement authorities, "netizens", and the like. The database server may hosted by an organization, a service provider such as AOL, Hotmail, Earthlink, Bright Light Technologies, and the like.

In one embodiment of the present invention, the SPAM policing server determines data files that can be used in conjunction with e-mail filter tools, as illustrated above. In one embodiment, end-users may download updated data files via the Internet, for example, and in another embodiment, the SPAM policing server may periodically send updated data files for the filtering software to subscribers or users. Such filtering tools may be an integral part of the e-mail program, as in the case of GroupWise and Outlook, alternatively, the filtering tools may also work in conjunction with such programs. Embodiments of the filtering tools may also be applied to web-based and subscription-base e-mail systems.

In another embodiment of the present invention, it is contemplated that although the SPAM policing server maintains a permanent record of junk e-mail senders, and the like, the data files for the e-mail filters are drawn from a particular time window. For example, spammer may be identified in the data files for the most recent three months, for the most recent four weeks, and the like. Further, some junk e-mail senders may be seasonal, thus filtering data files will include such seasonal e-mail senders during particular times of the year. Such an embodiment prevents the filtering data files and e-mail filtering software from getting too large and unwieldy. Because some junk e-mail senders and ISPs are "fly-by-night" organizations, the time window where some junk e-mail is sent is limited to reduce "stale" spammers.

In one embodiment, when a threshold number of reports regarding the same SPAM, spammer, or the like are received by the SPAM policing server, only then will the SPAM, spammer, or the like be transferred to the filter-out data file. A threshold may be determined by number of reports, geographic area of such reports, and the like. Such an embodiment would reduce the chance of a small group of disgruntled e-mail recipients to brand legitimate e-mail messages as SPAM In another embodiment of the present invention, data files for e-mail filters may be based upon frequency of complaints from e-mail recipients, preferably based upon the log comparing techniques described above. For example the top 100/500/1000 junk e-mail senders or ISPs can be identified in the data files and filtered out by e-mail recipients. In other embodiments of the present invention, combinations of the above techniques can be used to determine what junk e-mail senders, and the like should be filtered-out. In general, when implemented world wide, it is contemplated that database server identifies junk e-mail senders and ISPs that do not adhere to etiquette of the Internet, and to local, state, and federal laws.

An additional action includes automatically notifying ISP 1030 of sender's 1010 failure to comply with the recipient's request along with a relevant portion of log 1070. If ISP 1030 determines there is a pattern of non-compliance from certain ISPs or e-mail senders, ISP 1030 may approach governmental authorities with such information, post such information on their web site, or send such information to a "clearing house" of such information, as described above. In the latter two cases, ISPs or e-mail senders' may become "persona non grata" (blacklisted) on the Internet and/or e-mail from these sources are filtered-out by recipients. An example of one such "clearing house" of information related to junk e-mail, or unsolicited commercial e-mail (UCE) is found at the following web site: http://www.cauce.org/

Figure 11:
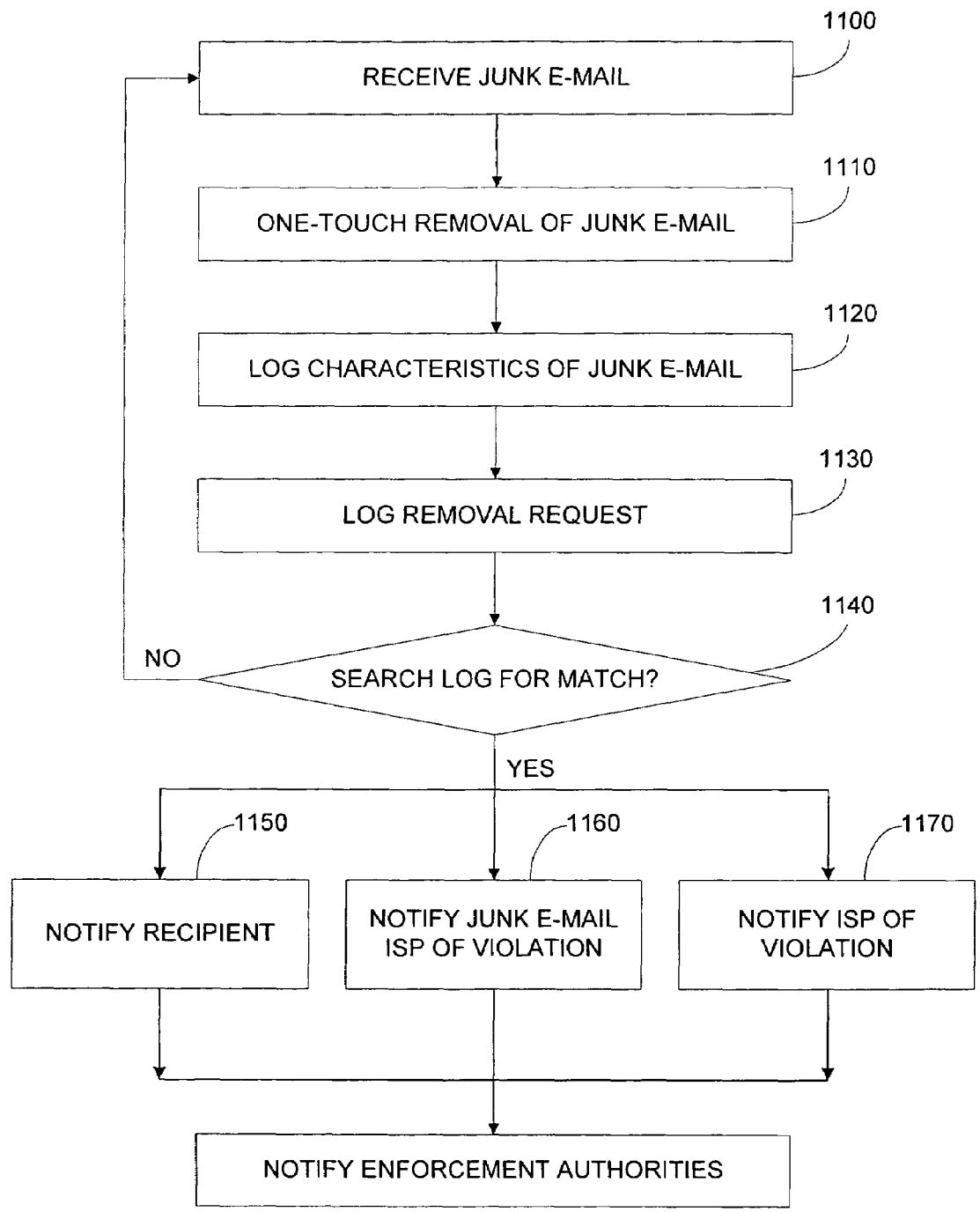

FIG. 11 illustrates a flow diagram of an embodiment of the present invention. The description of FIG. 11 incorporates references found in FIG. 10, but should not be limiting. Initially a unwanted e-mail message is received by a recipient on computer system 1000, step 1100. The recipient then utilizes the above described embodiment of the present invention to efficiently request removal from the e-mail mailing list, step 1110. Next, characteristic features of the e-mail message, such as the header information, the senders name, address, etc, the subject line, and the like are stored in log 1070, step 1120. The date for request for removal, and/or the reply message is also stored in log 1070, step 1130.

Subsequently log 1070 is searched for previous instances of the same e-mail message, the same sender, same header information, and the like, step 1140. If there is a match in log 1070, the recipient is notified, step 1150. In addition, or alternatively as disclosed above, an e-mail message is sent to ISP 1020 detailing how sender 1010 has ignored the recipient's previous requests, step 1160. In addition, or alternatively as disclosed above, an e-mail message is also sent to ISP 1030 with similar information, step 1170.

In one aspect, the present embodiment is also useful where sender 1010 is violating ISP's 1020 terms of use conditions. For example, ISP 1020 may not realize sender 1010 is sending out unwanted e-mail, in violation of the ISP's terms of service and use, until an e-mail is sent to ISP 1020 notifying them that sender 1020 has not been honoring the "remove" request.

The present embodiment is also useful where there is "hijacking" of an ISP address. As is known in the industry, "hijacking" or "spoofing" occurs when senders 1010 use an ISP's address as a source of the unwanted e-mail messages, although the ISP is not senders 1010 true ISP. In such a case, typically when the unwanted e-mail message is replied-to, the reply e-mail will bounce because the sender is not at the ISP's address. Thus, in the present embodiment, when an ISP begin receiving messages indicating that sender 1010 has not heeded recipients' requests for removal, the ISP is then on notice of the address hijacking or spoofing. As a result, the ISP will typically determine the true ISP or the sender in order to protect their on-line reputation.

In other embodiments of the present invention, the reply-to address of e-mail message is not used, but instead the "true" address is used. In the situation where there is a high degree of "hijacking" or "spoofing" occurring, embodiments of the present invention can be implemented to automatically trace the true ISP address of the junk e-mail sender based upon the e-mail header information.

Although the above invention has been described using a specific sequence of steps. It would be recognized that other variations can exist. For example, the sequence of steps can be changed in order. Additionally, a step in the sequence of steps can be removed. For example, as described above, reporting of SPAM may occur the first "bite of the SPAM apple," not only when the spammer takes the second "bite of the SPAM apple."

If, as is expected, world wide usage of the inventions disclosed in this application occurs, hundreds of millions of users will be able to quickly, and easily identify and report occurrences of SPAM being sent with a single click of a button. In an alternative embodiment, a reduced number of users will have the ability to directly report to the SPAM servers. In such embodiments, a sampling of SPAM messages may be taken, regional SPAM policing servers may be set-up, particular power-users may be selected, and the like, to reduce the SPAM reporting data load.

In a timely manner, a SPAM policing server can then receive the SPAM notice, process the SPAM, update the filter-out data files, and update e-mail filters almost immediately. Because of the timeliness of the SPAM detection turn-around time, it is expected that there is less of an incentive for spammers to continue their spamming.

Alternatively, steps in the sequence can be combined. Furthermore, an additional step or steps can be inserted. These and other combinations will be apparent to those of ordinary skill in the art.

In light of the disclosed embodiments, enhancements to the present invention include additional icons within an e-mail program can be provided to reply in other ways to e-mail messages in general. For example, in office environments, commonly meetings are scheduled by e-mail. Such e-mail messages often request recipients of the message to reply to the message or to send an e-mail message to a third party so there can be a head count for seating, purposes, for providing the correct amount of refreshments, for printing the enough meeting materials, and the like. Such e-mail messages require the user to perform time consuming tasks such as determining who a reply e-mail message must be sent to, typing in a message, calling a person by telephone, and the like. In this example, a standardized method for replying to such meeting invitations can be accomplished by providing an confirm icon, on the users' e-mail system. In such an embodiment, when the user sees such a request, by simply clicking upon the confirm icon, the user confirms their attendance.

While the above is a full description of the specific embodiments, various modifications, alternative constructions and equivalents may be used. For example, the above techniques for removal may be applied towards e-mail server programs such as Groupwise, Outlook, and the like; web-based e-mail services such as HotMail, Yahoo!, Excite, and the like; ISP providers such as Earthlink GeoCities, and the like; subscription services such as AOL, Compuserve, Prodigy, and the like. Further, the techniques for filtering may be applied to the e-mail services described above, in addition to SPAM filtering software, such as provided by Bright Light Technologies, and others. Therefore, the above description and illustrations should not be taken as limiting the scope of the present invention which is defined by the appended claims.

What is claimed is:

1. A method for a computer system comprises
receiving a first unsolicited commercial electronic mail message initiated by an e-mail sender at an electronic mail address associated with an e-mail recipient;
sending an electronic message to the e-mail sender, wherein the electronic message includes a request that the e-mail sender refrain from initiating any future unsolicited commercial electronic mail messages to the electronic mail address where the first unsolicited commercial electronic mail message was received;
storing an indication that the electronic message including the request that the e-mail sender refrain from initiating any future unsolicited commercial electronic mail messages to the electronic mail address was sent to the e-mail sender in a log;
receiving a second unsolicited commercial electronic mail message at the electronic mail address;
automatically determining whether the e-mail sender is in violation of the request that the e-mail sender refrain from initiating any future unsolicited commercial electronic messages to the electronic mail address, in response to the second unsolicited commercial electronic mail message and in response to the log; and
when the e-mail sender is in violation of the request, reporting a violation of the request that the e-mail sender refrain from initiating any future unsolicited commercial electronic messages to the electronic mail address.

2. The method of claim 1 wherein reporting the violation of the request comprises reporting the violation of the request that the e-mail sender refrain from initiating any future unsolicited commercial electronic messages to the electronic mail address to a user selected from a group of users consisting of: a user associated with the electronic mail address, an internet service provider, a governmental entity.

3. The method of claim 2 wherein the internet service provider is selected from a group consisting of: internet service provider associated with the user, internet service provider associated with the e-mail sender.

4. The method of claim 3 wherein reporting the violation of the request comprises providing the first unsolicited commercial electronic mail message, the electronic message, and the second unsolicited commercial electronic mail message to the internet service provider.

5. The method of claim 4 wherein the internet service provider determines that the second unsolicited commercial electronic mail message includes header information that uses a domain name associated with the internet service provider without permission of the internet service provider, in response to the violation of the request.

6. The method of claim 2 wherein the governmental entity is selected from a group consisting of: law enforcement authorities, state authorities, federal authorities.

7. The method of claim 1 wherein the electronic message is selected from a group consisting of: a reply electronic mail message, an Internet-based communication.

8. The method of claim 1 further comprising:
storing in a file an e-mail address associated with the e-mail sender; and
wherein automatically determining whether the e-mail sender is in violation of the request comprises comparing an e-mail address associated with a sender of the second unsolicited commercial electronic mail message to the e-mail address associated with the e-mail sender in the file.

9. The method of claim 1 wherein reporting the violation of the request comprises reporting the violation of the request that the e-mail sender refrain from initiating any future unsolicited commercial electronic messages to the electronic mail address to a third-party clearing house of request violations.

10. The method of claim 1 further comprising:
determining an electronic mail rule in response to the first unsolicited commercial electronic mail message initiated by the e-mail sender,
wherein the electronic mail rule determines whether subsequent e-mail messages are initiated by the e-mail sender,
wherein when a subsequent e-mail was initiated by the e-mail sender, the electronic mail rule generates a violation report;
wherein when the subsequent e-mail was initiated by the e-mail sender, the electronic mail rule automatically deletes the subsequent e-mail;
wherein automatically determining whether the e-mail sender in violation of the request is performed by the electronic mail rule; and
wherein reporting the violation of the request comprises outputting the violation report.

11. The method of claim 1 wherein receiving the first unsolicited commercial electronic mail message comprises receiving the first unsolicited commercial electronic mail message via an e-mail interface selected from a group consisting of: Outlook, Group Wise, HotMail, Yahoo!, Excite, Earthlink, GeoCities, AOL, Compuserve, Prodigy, MSN.

12. A computer system comprises:
a processor configured to execute code; and
a memory coupled to the processor, wherein the memory includes:
code that directs the processor to provide a first junk e-mail message initiated by an e-mail sender to a user associated with a user e-mail address;
code that directs the processor to receive a remove request from the user regarding the first junk e-mail message;
code that directs the processor to send an electronic message to the e-mail sender including a request that the e-mail sender not to initiate sending of any future junk e-mail messages to the user e-mail address,
code that directs the processor to store the electronic message including the request in the memory;
code that directs the processor to determine receipt of a second junk e-mail message initiated by the e-mail sender to the user e-mail address;
code that directs the processor to generate a report of a violation of the request that the e-mail sender not to initiate sending of any future junk e-mail messages to the user e-mail address, in response receipt of the second junk e-mail message.

13. The computer system of claim 12 wherein the memory further comprises:
code that directs the processor to send the report of the violation to a third-party server.

14. The computer system of claim 13 wherein the third party server comprises a service provider associated with the second junk e-mail message.

15. The computer system of claim 14 wherein the service provider associated with the second junk e-mail message determines that the second junk e-mail message includes header information that uses a domain name of the service provider without permission of the service provider, in response to the report of the violation.

16. The computer system 13
wherein the third party server provides e-mail filtering-out services, and
wherein the third party server returns updated e-mail filters in response to the report of the violation.

17. The computer system 16 wherein the memory further comprises
code that directs the processor to filter-out subsequent junk e-mail messages from the e-mail sender, in response to the updated e-mail filters.

18. The computer system of claim 13 wherein the third party server comprises a governmental entity selected from a group consisting of: law enforcement authorities, state authorities, federal authorities.

19. The computer system of claim 12 wherein the report of the violation includes an indication of the first junk e-mail message, an indication of the second junk e-mail message, an indication of the e-mail sender, and an indication of the electronic message including the request.

20. The computer system of claim 19 wherein the memory further comprises:
code that directs the processor to identify the e-mail sender when a number of reports of violations of requests including an indication of the e-mail sender exceeds a threshold.

21. The computer system of claim 12 wherein the code that directs the processor to send the request to the e-mail sender comprises code that directs the processor to sending to the e-mail sender a communication selected from a group consisting of: reply electronic mail message, Internet-based communication.

22. The computer system of claim 21 wherein the memory also includes:
code that directs the processor to provide the report of the violation of the request to the user at the user e-mail address.

23. A computer program product resident of computer-readable medium for instructing a computer system including a processor and a display comprises:
code that directs the processor to initiate sending an electronic message to an e-mail sender associated with a first unsolicited commercial e-mail message, wherein the electronic message comprises a request of the e-mail sender to not send any future unsolicited commercial e-mail message to a user e-mail address where the first unsolicited commercial e-mail message was addressed, in response to input from a user associated with the user e-mail address;
code that directs the processor to maintain a log of the first unsolicited commercial e-mail message and the electronic message including the request;
code that directs the processor to generate a report when a second unsolicited commercial e-mail message to the user e-mail address is received from the e-mail sender; and
code that directs the processor to output the report.

24. The computer program product of claim 23 wherein the report comprises an indication of the first unsolicited commercial e-mail message, the second unsolicited commercial e-mail message, and the request of the e-mail sender to not send any future unsolicited commercial e-mail message to a user e-mail address.

25. The computer program product of claim 24 wherein code that directs the processor to output the report comprises code that directs the processor to output the report to a party selected from a group consisting of: internet service provider, e-mail service provider, third-party server, governmental authority.

26. The computer program product of claim 25
wherein the report is output to a third party server;
wherein the third party server updates a filter-out rule to include the e-mail sender in response to the report; and
wherein the computer program product further comprises code that directs the processor to receive and implement the filter-out rule from the third party server.

27. The computer program product of claim 25 wherein the report is output to a governmental authority selected from a group consisting of: law enforcement agency, state agency, federal agency.

28. The computer program product of claim 25 wherein the report is output to a service provider associated with the user e-mail address.

29. The computer program product of claim 24 wherein code that directs the processor to output the report comprises code that directs the processor to output the report to the user.

30. The computer program product of claim 23 wherein the electronic communication is selected from a group consisting of: reply electronic mail message, Internet-based communication.

31. The computer program product of claim 30 further comprising:
code that directs the processor to initiate an e-mail rule configured to filter out e-mail messages from the e-mail sender in response to the user input and the first unsolicited commercial e-mail message.

32. The computer program product of claim 31 wherein the e-mail rule is configured to determine if a second unsolicited commercial e-mail message to the user e-mail address is from the e-mail sender.

33. The computer program product of claim 23 wherein the codes are compatible with e-mail services selected from a group consisting of: Outlook, Group Wise, HotMail, Yahoo!, Excite, Earthlink, GeoCities, AOL, Compuserve, Prodigy, MSN.

* * * * *

UNITED STATES PATENT AND TRADEMARK OFFICE
CERTIFICATE OF CORRECTION

| | |
|---|---|
| PATENT NO. | : 7,275,082 B2 |
| APPLICATION NO. | : 10/656502 |
| DATED | : September 25, 2007 |
| INVENTOR(S) | : Stephen Y. F. Pang |

It is certified that error appears in the above-identified patent and that said Letters Patent is hereby corrected as shown below:

Column 1, line 7, replace "claims priority to" with --is a continuation of--.

Signed and Sealed this
Fourth Day of October, 2011

David J. Kappos
*Director of the United States Patent and Trademark Office*